United States Patent
Kalamatianos et al.

(10) Patent No.: US 11,113,065 B2
(45) Date of Patent: Sep. 7, 2021

(54) SPECULATIVE INSTRUCTION WAKEUP TO TOLERATE DRAINING DELAY OF MEMORY ORDERING VIOLATION CHECK BUFFERS

(71) Applicant: Advanced Micro Devices, Inc., Santa Clara, CA (US)

(72) Inventors: John Kalamatianos, Boxborough, MA (US); Susumu Mashimo, Fukuoka (JP); Krishnan V. Ramani, Santa Clara, CA (US); Scott Thomas Bingham, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/671,097

(22) Filed: Oct. 31, 2019

(65) Prior Publication Data
US 2020/0319889 A1 Oct. 8, 2020

Related U.S. Application Data

(60) Provisional application No. 62/828,861, filed on Apr. 3, 2019.

(51) Int. Cl.
*G06F 9/38* (2018.01)
*G06F 9/30* (2018.01)

(52) U.S. Cl.
CPC ........ *G06F 9/3842* (2013.01); *G06F 9/30043* (2013.01)

(58) Field of Classification Search
CPC .................................................. G06F 9/3842
See application file for complete search history.

(56) References Cited

U.S. PATENT DOCUMENTS

| | | | |
|---|---|---|---|
| 6,058,472 | A | 5/2000 | Panwar et al. |
| 2002/0194457 | A1 | 12/2002 | Akkary |
| 2002/0199066 | A1 | 12/2002 | Chaudhry et al. |
| 2012/0102357 | A1 | 4/2012 | Ramani et al. |

(Continued)

OTHER PUBLICATIONS

Ros, A. & Kaxiras, S., "The Superfluous Load Queue", 51st Annual IEEE/ACM International Symposium on Microarchitecture, 14 pgs., Oct. 2018.

(Continued)

*Primary Examiner* — Michael J Metzger
(74) *Attorney, Agent, or Firm* — Volpe Koenig

(57) ABSTRACT

A technique for speculatively executing load-dependent instructions includes detecting that a memory ordering consistency queue is full for a completed load instruction. The technique also includes storing data loaded by the completed load instruction into a storage location for storing data when the memory ordering consistency queue is full. The technique further includes speculatively executing instructions that are dependent on the completed load instruction. The technique also includes in response to a slot becoming available in the memory ordering consistency queue, replaying the load instruction. The technique further includes in response to receiving loaded data for the replayed load instruction, testing for a data mis-speculation by comparing the loaded data for the replayed load instruction with the data loaded by the completed load instruction that is stored in the storage location.

20 Claims, 5 Drawing Sheets

(56) References Cited

U.S. PATENT DOCUMENTS

| | | | | |
|---|---|---|---|---|
| 2012/0221835 A1* | 8/2012 | Tran | ................... | G06F 9/3826 |
| | | | | 712/208 |
| 2012/0303934 A1* | 11/2012 | Kaplan | ............... | G06F 9/30043 |
| | | | | 712/205 |
| 2015/0100766 A1 | 4/2015 | Abdallah | | |
| 2019/0108035 A1* | 4/2019 | Gonzalez | .................. | G06F 9/24 |
| 2020/0310817 A1* | 10/2020 | Cook | ................... | G06F 9/3824 |

OTHER PUBLICATIONS

Pericas, M., et. al., "A Two-Level Load/Store Queue Based on Execution Locality", 2008 International Symposium on Computer Architecture, IEEE, 12 pgs., Jun. 2008.

Park, I., et. al., "Reducing Design Complexity of the Load/Store Queue", 36th Annual IEEE/ACN International Symposium on Microarchitecture, IEEE, 13 pgs., Dec. 2003.

Baugh, L., & Zilles, C., "Decomposing the Load-Store Queue by Function for Power Reduction and Scalability", IBM Journal of Research and Development, vol. 50, No. 2.3, 9 pgs., Apr. 2006.

Sethumadhavan, S., et. al., "Late-Binding: Enabling Unordered Load-Store Queues", 34th International Symposium on Computer Architecture, 12 pgs., Jun. 2007.

Roth, A., "Store Vulnerability Window (SVW): Re-Execution Filtering for Enhanced Load Optimization", Proceedings of the 32nd International Symposium on Computer Architecture, IEEE, 13 pgs., Jun. 2005.

Ros, A., et. al., "Non-Speculative Load-Load Reordering in TSO, 2017 ACM/IEEE 44th Annual International Symposium on Computer Architecture", IEEE, 15 pgs., Jun. 2017.

Castro, F., et. al., "Load-Store Queue Management: an Energy-Efficient Design Based on a State-Filtering Mechanism, 2005 International Conference on Computer Design", IEEE, 8 pgs., Oct. 2005.

\* cited by examiner

SPECULATIVE INSTRUCTION WAKEUP TO TOLERATE DRAINING DELAY OF MEMORY ORDERING VIOLATION CHECK BUFFERS

CROSS-REFERENCE TO RELATED APPLICATIONS

This application claims priority to U.S. Provisional Patent Application Ser. No. 62/828,861, entitled "SPECULATIVE INSTRUCTION WAKEUP TO TOLERATE DRAINING DELAY OF MEMORY ORDERING VIOLATION CHECK BUFFERS," and filed on Apr. 3, 2019, the entirety of which is incorporated herein by reference.

STATEMENT REGARDING GOVERNMENT INTEREST

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Out of order processors execute instructions out of order but obey certain constraints to ensure that execution occurs as specified by the program. One class of constraints involves ensuring that certain memory ordering semantics are followed. Constraints related to memory ordering semantics may be relaxed to improve performance, but additional steps need to be taken to ensure execution correctness.

BRIEF DESCRIPTION OF THE DRAWINGS

A more detailed understanding may be had from the following description, given by way of example in conjunction with the accompanying drawings wherein.

DETAILED DESCRIPTION

A technique for speculatively executing load-dependent instructions is provided. The technique includes detecting that a memory ordering consistency queue is full for a completed load instruction. The technique also includes storing data loaded by the completed load instruction into a storage location for storing data when the memory ordering consistency queue is full. The technique further includes speculatively executing instructions that are dependent on the completed load instruction. The technique also includes in response to a slot becoming available in the memory ordering consistency queue, replaying the load instruction. The technique further includes in response to receiving loaded data for the replayed load instruction, testing for a data mis-speculation by comparing the loaded data for the replayed load instruction with the data loaded by the completed load instruction that is stored in the storage location.

A processor subsystem for speculatively executing load-dependent instructions is provided. The processor subsystem includes a memory ordering consistency queue and a load/store unit. The load/store unit detects that a memory ordering consistency queue is full for a completed load instruction, writes data loaded by the completed load instruction into a storage location for storing data when the memory ordering consistency queue is full, permits instructions that are dependent on the completed load instruction to speculatively execute, in response to a slot becoming available in the memory ordering consistency queue, replays the load instruction, and in response to receiving loaded data for the replayed load instruction, tests for a data mis-speculation by comparing the loaded data for the replayed load instruction with the data loaded by the completed load instruction that is stored in the storage location.

A processor for speculatively executing load-dependent instructions is provided. The processor includes a memory ordering consistency queue, a load/store unit, and one or more functional units. The load/store unit detects that a memory ordering consistency queue is full for a completed load instruction, writes data loaded by the completed load instruction into a storage location for storing data when the memory ordering consistency queue is full, permits instructions that are dependent on the completed load instruction to speculatively execute, in response to a slot becoming available in the memory ordering consistency queue, replays the load instruction, and in response to receiving loaded data for the replayed load instruction, tests for a data mis-speculation by comparing the loaded data for the replayed load instruction with the data loaded by the completed load instruction that is stored in the storage location. The one or more functional units speculatively execute the instructions that are dependent on the completed load instruction.

Figure 1:
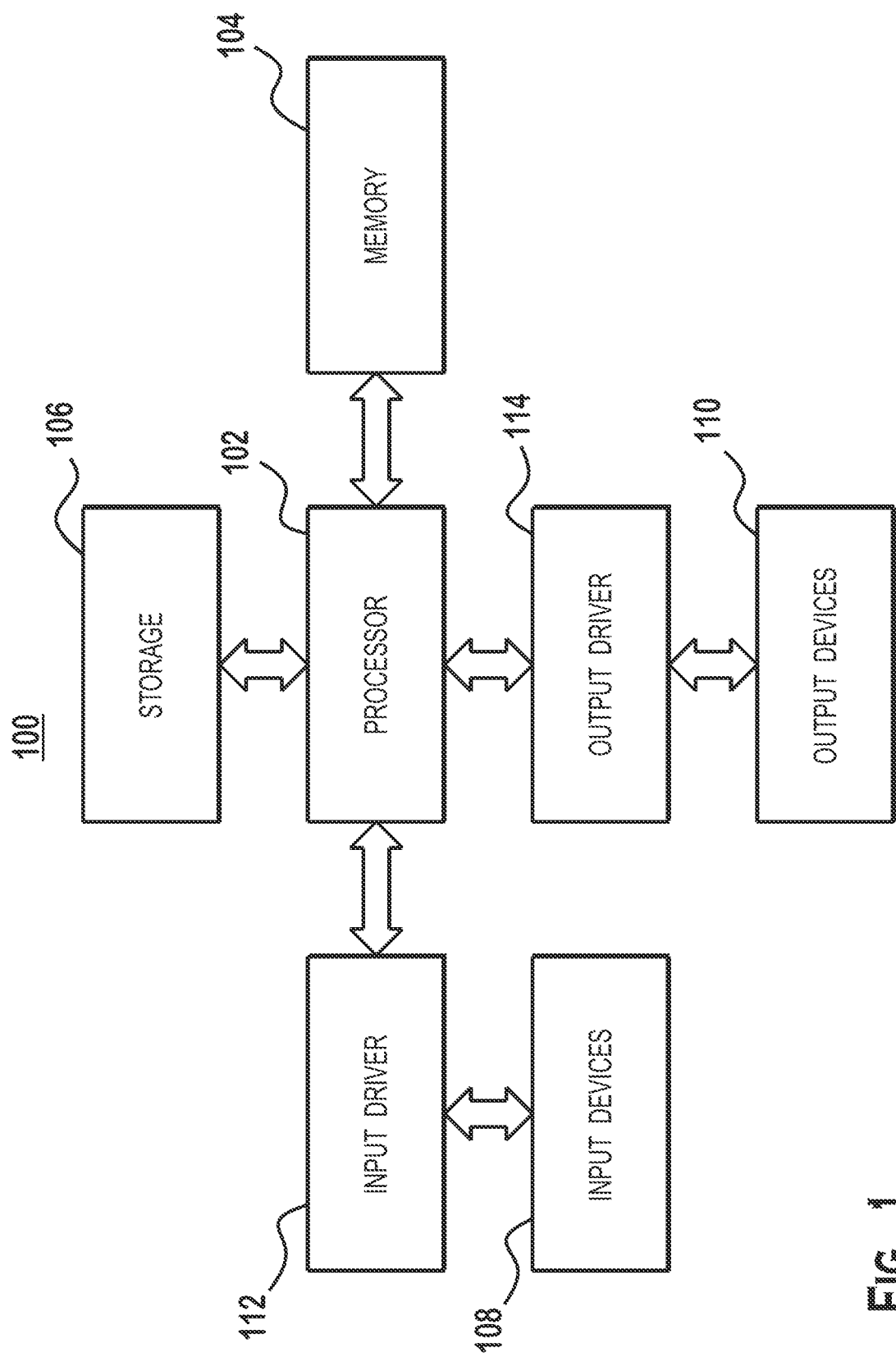
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
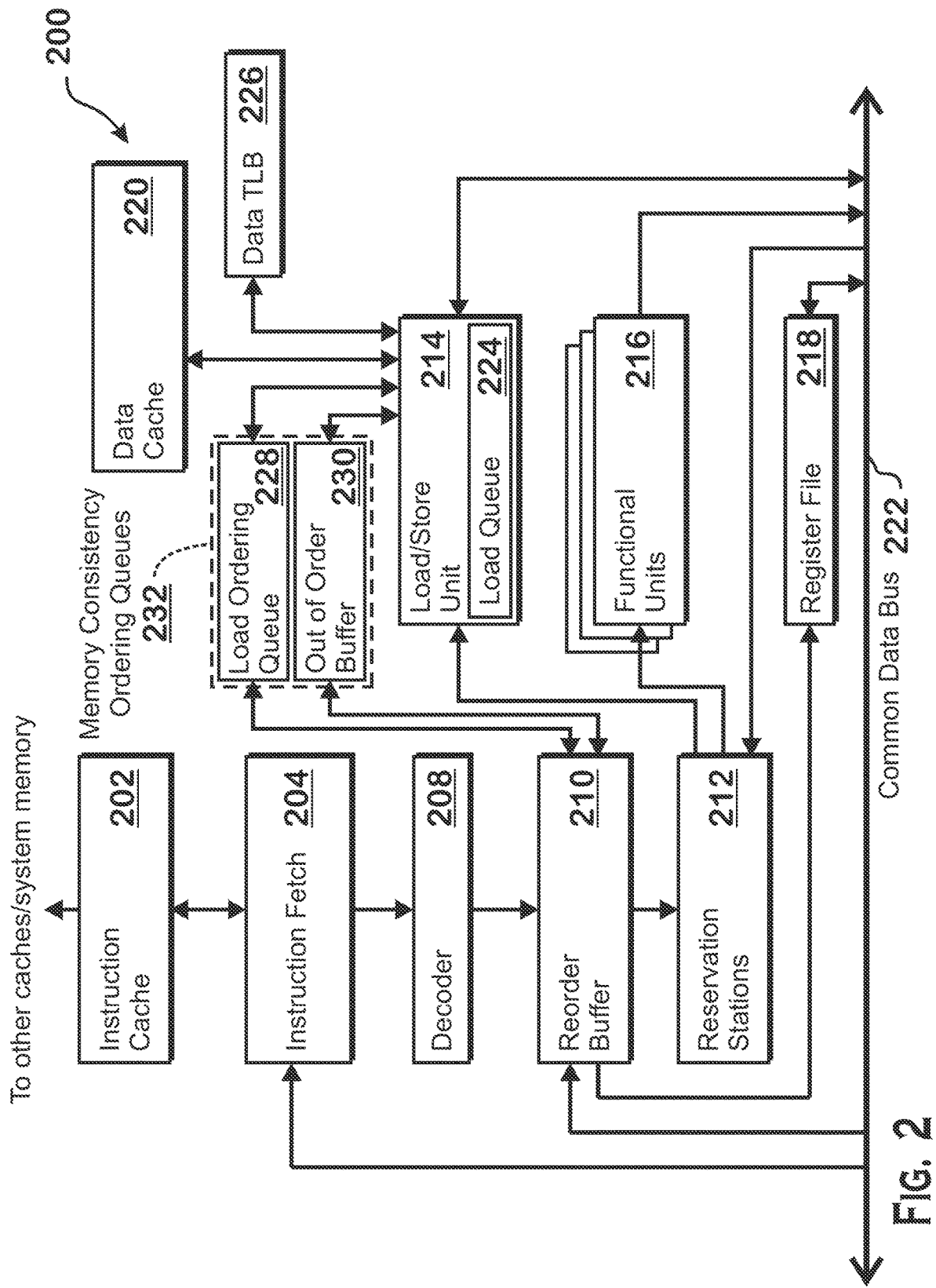
FIG. 2 is a block diagram of an instruction execution pipeline, located within the processor of FIG. 1, according to an example.

FIG. 2 is a block diagram of an instruction execution pipeline 200, located within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 that fetches instructions from system memory (such as memory 104) via an instruction cache 202, a decoder 208 that decodes fetched instructions, functional units 216 that perform calculations to process the instructions, a load/store unit 214, that loads data from or store data to system memory via a data cache 220, and a register file 218 which includes registers that store working data for the instructions. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., non-speculative results written to a register file, or the like). Reservation stations 212 maintain instructions waiting to be executed on the functional units 216 and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to the youngest, non-speculative copy of the architectural register by an add instruction; writing a loaded value to the youngest, non-speculative copy of an architectural register by a load instruction; or non-speculatively causing instruction flow to jump to a new location by a branch instruction are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

The instruction execution pipeline 200 is capable of executing load instructions and store instructions (among other instructions). Load instructions are instructions that load data from memory and place that data into a register in the register file 218. Store instructions are instructions that store data from a register to a memory location. For either stores or loads, the specified address is calculated based on the contents of one or more registers and/or one or more values specified in the instruction itself. Further, for loads or stores that specify virtual memory addresses, those addresses are translated into physical addresses.

The load/store unit 214 supports a memory consistency model that specifies the relative order in which software observes the execution of loads and stores. In an example, the load/store unit 214 implements a load ordering consistency model in which load instructions appear to software to execute in order with respect to load instructions of other threads. In detail, this load ordering memory consistency model operates as follows. The reservation station 212 issues a load instruction to the functional units 216 to generate a virtual address (e.g., calculating the virtual address in the manner specified by the load instruction). Subsequently, the functional units 216 transmits the load instruction to the load/store unit 214, which executes the load instruction, fetching the translation to a physical address from the data translation lookaside buffer ("TLB") 226 and fetching the data based on the physical address from the data cache 220. In some implementations, the load/store unit 214 stores the load in the load queue 224 in response to the load instruction being dispatched from the decoder 208 to the reorder buffer 210. In other implementations, the load is placed in the load queue 224 at any other technically feasible time.

When the data requested by the load instruction is returned, the load instruction is considered complete. However, the reorder buffer 210 does not mark the load instruction as eligible to retire until memory consistency violations have been checked. If a violation to the memory consistency model occurs for the load instruction, then the load/store unit 214 causes the load instruction (and in various situations, instructions younger than that load instruction) to be flushed from the instruction pipeline 200 and causes the load instruction to be replayed. In some implementations, two types of violations are possible: a violation to load-to-load ordering and a violation to store-to-load ordering.

The definition of load-to-load ordering depends on the ordering rules imposed by the memory consistency model. In some implementations, memory ordering requires that all loads appear to execute in program order, independent of whether the loads access the same address or not. Load-to-load ordering is enforced by checking if loads observe the same values as each other as the loads become eligible to retire in program order. Such enforcement is accomplished by monitoring external probes to the data cache 220 and evictions of the data cache 220. If an external probe to an address ("A") arrives at the data cache 220, and there is an instruction in the load ordering queue 228 that reads from address A, then it is determined that the oldest such instruction in the load ordering queue 228 has experienced a load-to-load ordering violation. If the data at address A is evicted from the data cache 220 before a load instruction at address A becomes the oldest load in the reorder buffer 210, then that instruction has experienced a load-to-load ordering violation. In the case of a load-to-load ordering violation for a load instruction, the load/store unit 214 causes that load instruction to be flushed from the instruction execution pipeline 200 and to be replayed.

Store-to-load ordering is a memory ordering rule that requires all loads to receive data from store operations as defined by program order (i.e., the order in which instructions are supposed to be executed in according to the control flow of the software executing those instructions). Store-to-load ordering is enforced between instructions of the same threads, to prevent load instructions from consuming stale data, since the instruction execution pipeline 200 is capable of executing instructions, including load instructions and store instructions, out of order.

To enforce memory ordering rules in an out-of-order processor (e.g., processor 102), the instruction pipeline 200 is permitted to, and sometimes does, execute load and store instructions out of order. When a load instruction is complete but is not ready to retire, the instruction pipeline 200 monitors that load instruction for a violation of one or more memory ordering rules. A load instruction is ready to retire when there is no possibility that a violation of the memory ordering rules can occur for that load instruction. It is possible for a load instruction to complete and be ready to retire at the same time, in which case checking for violation of a memory ordering rules for that load instruction does not occur. In the case that a violation occurs, the load instruction is flushed from the pipeline 200 and is replayed. Depending on the replay mechanism, other instructions, such as instructions that are younger than the load instruction, are flushed as well. In the case that a violation does not occur, the load instruction is permitted to retire, meaning that the results of the load instruction are committed to the architectural state of the instruction pipeline 200. Some example techniques for checking for violations are as follows.

In some examples, violations for load-to-load ordering are checked for in the following manner. In response to a load instruction completing, and that load instruction not being the oldest load instruction that would be in the load ordering queue 228, the load/store unit 214 removes that instruction from the load queue 224 and places the instruction in the load ordering queue 228. If the load instruction is the oldest load instruction that would be in the load ordering queue 228 when the load instruction completes, then the load/store unit 214 removes that instruction from the load queue 224 and does not place that instruction in the load ordering queue 228.

While the load instruction is in the load ordering queue 228, the load/store unit 214 monitors the cache line in the lowest level cache (e.g., L1 cache) that stores the loaded data. In the event that either: the cache line is evicted from the cache (e.g., due to being replaced by a different cache line); or the cache line is accessed by a different thread than the thread that executed the load instruction (where the access is identified by a probe being received at the cache), the load/store unit 214 determines that a load-to-load ordering violation has occurred. If no violation has occurred by the time the load instruction is no longer to be monitored in the load ordering queue 228, then the load/store unit 214 removes the load instruction from the load ordering queue 228. The load instruction is no longer to be monitored in the load ordering queue 228 in the situation that the load instruction is the oldest load instruction for that thread in the load ordering queue 228 and the load queue 224.

In some examples, violations for store-to-load ordering are checked for in the following manner. In response to a load instruction completing, and that load instruction being eligible for placement into the out of order buffer 230, the load/store unit 214 places the load instruction in the out of order buffer 230. A load instruction is eligible for placement into the out of order buffer 230 in the situation that there is a possibility for the load instruction to commit a violation of the store-to-load ordering rule. There is a possibility for such violation if there is at least one store instruction older than the load instruction, where the load/store unit 214 has not yet determined the physical address for the older store instruction. If a load instruction is not eligible for placement into the out of order buffer 230, the load/store unit 214 does not place the load instruction into the out of order buffer 230.

While in the out of order buffer 230, the load/store unit 214 checks for violations of the store-to-load ordering rules in the following manner. Upon determining the physical address for a store instruction that is older than the load instruction, the load/store unit 214 compares that physical address to the physical address of the load instruction. If there is a match, then the load/store unit 214 determines that a violation occurs and if there is no match, then the load/store unit 214 determines that a violation does not occur for that store instruction. In response to there being no more store instructions that are older than the load instruction and that have not yet had their physical addresses determined, the load/store unit 214 determines that a violation is no longer possible for the load instruction and removes the load instruction from the out of order buffer 230.

If both load to load ordering and store to load ordering are to be enforced, then the load instruction is not retired if the load instruction is still in one of the load ordering queue 228 or the out of order buffer 230, even if the load instruction is removed from one of those queues. In this situation, the load instruction is retired in the situation that the load instruction is no longer in either queue. It is also possible to use alternative or additional memory ordering rules, each with respective queues. In such a situation, a load instruction is retired in response to the load instruction being not present in all such queues. The load ordering queue, the out of order buffer, and/or any other queue used for memory consistency model verification, are referred to herein as memory consistency ordering queues 232.

In some situations, one or more of the memory consistency ordering queues 232 becomes full. If a load instruction completes, and is eligible to be placed in a memory consistency ordering queue 232, but that queue is full, then the load instruction is not placed into that memory consistency ordering queue 232. In that situation, the load instruction remains in the load queue 224 until a slot becomes free in the memory consistency ordering queue 232 that is full. Such a load instruction is sometimes referred to herein as being a load instruction that is waiting for a slot in a memory consistency ordering queue 232 to become free.

In one technique, while a load instruction is waiting for a slot in a memory consistency ordering queue to become free, no instructions that are dependent on the load instruction are issued for execution. An instruction is dependent on a load instruction if the instruction consumes, as an operand, the data loaded by the load instruction. This technique is "simple" in that the technique does not require special steps to identify whether a violation of the memory ordering rules has occurred for the instructions dependent on the load instruction. More specifically, such instructions are simply not executed, meaning that no such violation detection is necessary. However, performance improvement can be gained by executing such dependent instructions speculatively and using a mechanism for detecting a violation of the memory ordering rules.

Figure 3A:
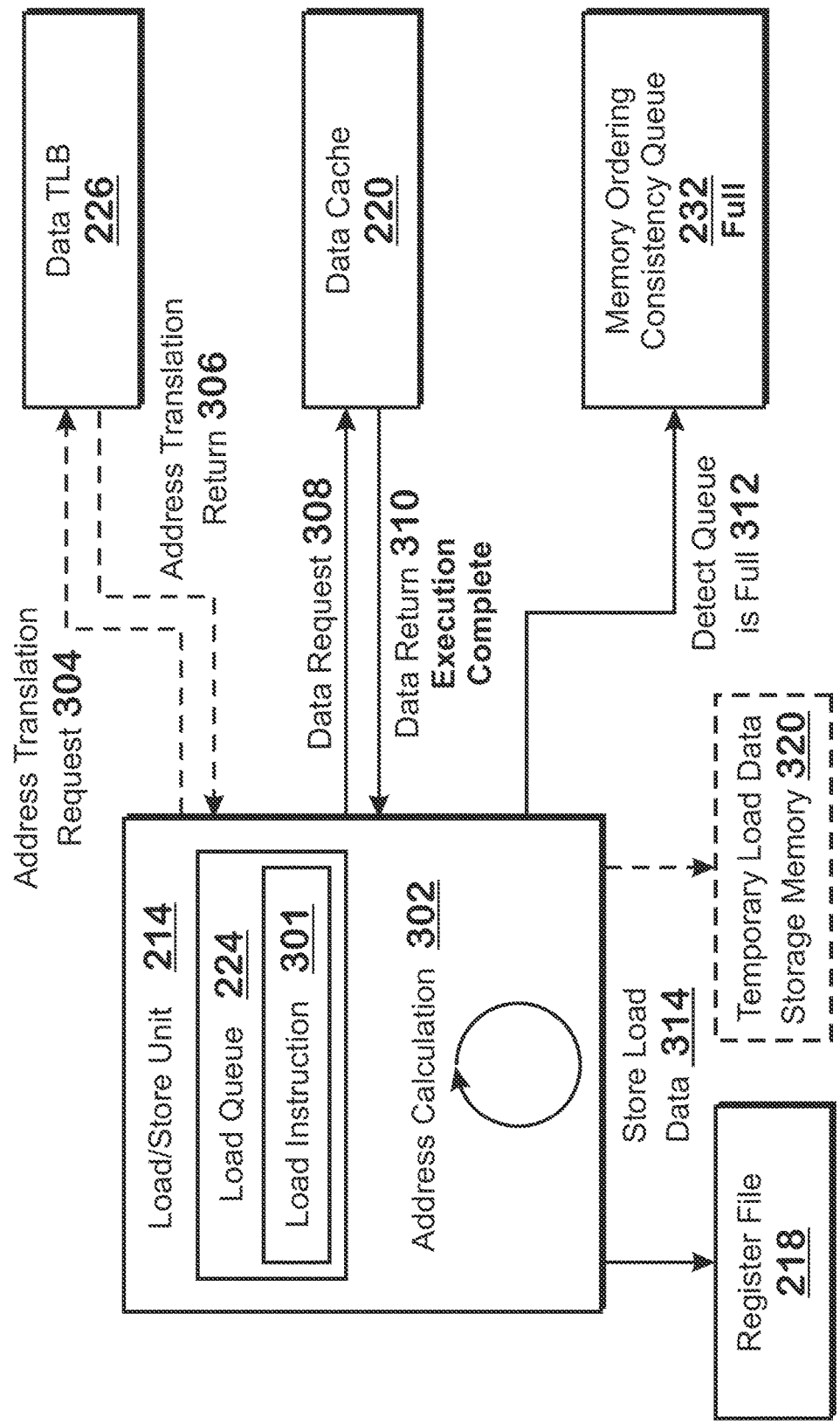
FIG. 3A illustrates example operations for triggering speculative execution of instructions that are dependent on load instructions that are eligible to be placed in a memory consistency ordering queue that is full.

FIG. 3A illustrates example operations for triggering speculative execution of instructions that are dependent on load instructions that are eligible to be placed in a memory ordering consistency queue 232 that is full. The load/store unit 214 receives a load instruction 301 for execution and places the load instruction 301 into the load queue 224. The load/store unit 214 performs address calculation 302 as specified by the load instruction 301. Address calculation 302 involves calculating the address from which data is to be loaded based on operations and operands specified explicitly or implicitly by the load instruction 301. If the load instruction 301 requires address translation (e.g., because the load instruction 301 specifies a virtual address), the load/store unit 214 requests address translation from the data TLB 226 at operation 304, and the data TLB 226 returns the translated address at operation 306. In operation 308, the load/store unit 214 requests the data at the address from the data cache 220 and the data cache 220 returns the requested data at operation 310. At this point, the load instruction is considered complete. However, because the load/store unit 214 executes memory instructions out of order, the load/store unit 214 checks for violations of memory ordering rules. As described elsewhere herein, if the load instruction is eligible to be placed into at least one memory ordering consistency queue 232, then the load/store unit 214 attempts to place the load instruction in such a queue.

However, in the operation of FIG. 3A, queue 232 is full. Thus at operation 312, the load/store unit 214 detects that at least one of the memory ordering consistency queues 232 that the load instruction is to be placed into is full. As described elsewhere herein, not all load instructions are to be placed in every memory ordering consistency queue 232. Discussions of when load instructions are or are not to be placed into a memory ordering consistency queue 232 are provided elsewhere herein. In general, a load instruction is placed into a memory ordering consistency queue 232 when it is possible for a violation of the type associated with that queue 232 to occur. A load instruction is not placed into a memory ordering consistency queue 232 when it is no longer possible for a violation of that type to occur. Operation 312 involves the load/store unit 214 detecting that at least one memory ordering consistency queue 232 that a load instruction is to be placed into is full.

In response to the detection 312, the load/store unit 214 retains the load instruction 301 in the load queue 214 and in operation 314, stores the data retrieved from the data cache 220 into a storage location for the retrieved data. In one example, the storage location is the register file 218. In another example, the storage location is a memory 320 for temporary storage of such load data. The load/store unit 214 later uses the data stored at the storage location for the retrieved data to check for violations of the data speculation for the speculatively executed load-dependent instructions. Using the register file 218 as the storage location provides the benefit that no additional cost (in terms of chip area) is used for checking for violations of the data speculation, and in addition, if the register file 218 port assigned to the load instruction to be placed into the memory ordering consistency queue 232 is read/write, then that port can be used "for free" for the purpose of checking for violations.

Figure 3B:
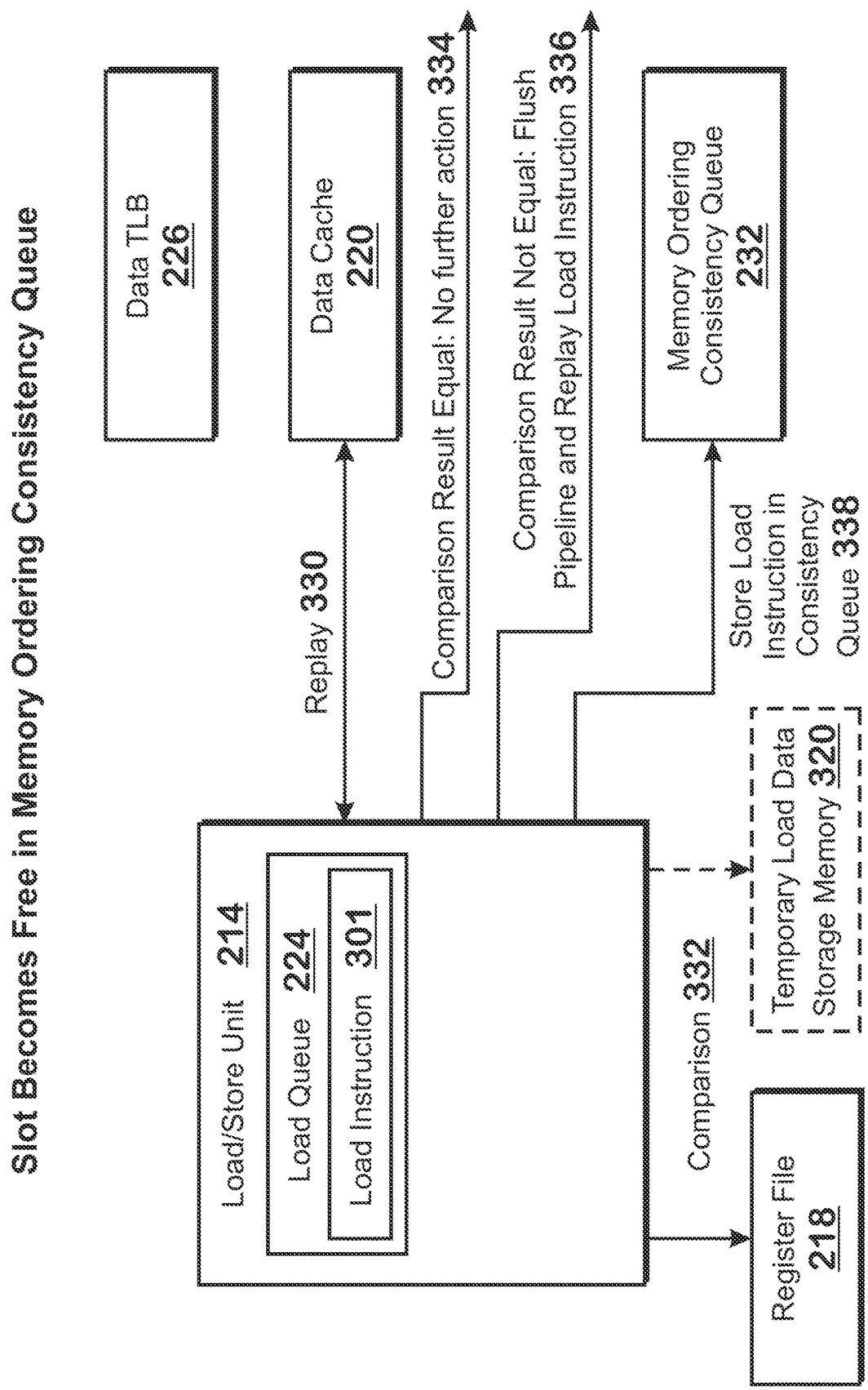
FIG. 3B illustrates example operations in response to a slot becoming free in a memory ordering consistency queue for a load instruction for which such queue was previously full.

FIG. 3B illustrates example operations in response to a slot becoming free in a memory ordering consistency queue 232 for a load instruction for which such queue 232 was previously full. In some implementations, the operations of FIG. 3B occur in response to a slot becoming free in all memory ordering consistency queues 232 that the load instruction is waiting for. In other implementations, the operations of FIG. 3B occurs each time a slot becomes free in one of the memory ordering consistency queues 232 that the load instruction is waiting for. In general, the operations of FIG. 3B illustrate checking for a data mis-speculation for load-dependent instructions that are retained in the load queue 224 due to a memory ordering consistency queue 232 being full.

At operation 330, the load/store unit 214 replays the load instruction 301. This replay involves fetching the data from the data cache 220. At operation 332, the load/store unit 214 compares the data retrieved for the replayed load instruction with the data stored in the storage location for the retrieved data from the original load instruction. If the data is the same, then no data mis-speculation has occurred for the instructions that are dependent on the load instruction and the load/store unit 214 does not flush the pipeline or replay the load instruction. If the data is not the same, then a data mis-speculation has occurred and the load/store unit 214 flushes the instruction pipeline 200 of at least the load instruction and the load-dependent instructions, and causes the load instruction to be replayed.

If the data is the same in operation 332, and the load instruction still is to be checked for violations of a memory ordering rule, then the load/store unit 214 stores the load instruction in a now free slot in the memory ordering consistency queue 232. The load/store unit 214 uses this slot to check for such violations at a later time as described elsewhere herein. The violations that are checked for are violations of the load instruction of the type associated with the queue 232 that has become freed. For example, if the load instruction was waiting for a slot in a load ordering queue 228, then the violation to be checked for is a violation of load-to-load ordering.

It is possible that at the time the comparison 332 is completed, the load instruction does not need to be checked for a violation of the memory ordering rule for the queue 232 for which the slot became free (for example because the load instruction would be the oldest load instruction in that queue 232 or all older store instructions have already had their physical addresses calculated and none of them conflict with the load instruction). In that instance, the load instruction is not placed into that queue 232. If at this point the load instruction is not resident in the load queue 224 or in any memory ordering consistency queue 232, then the load instruction is ready to retire.

Figure 4:
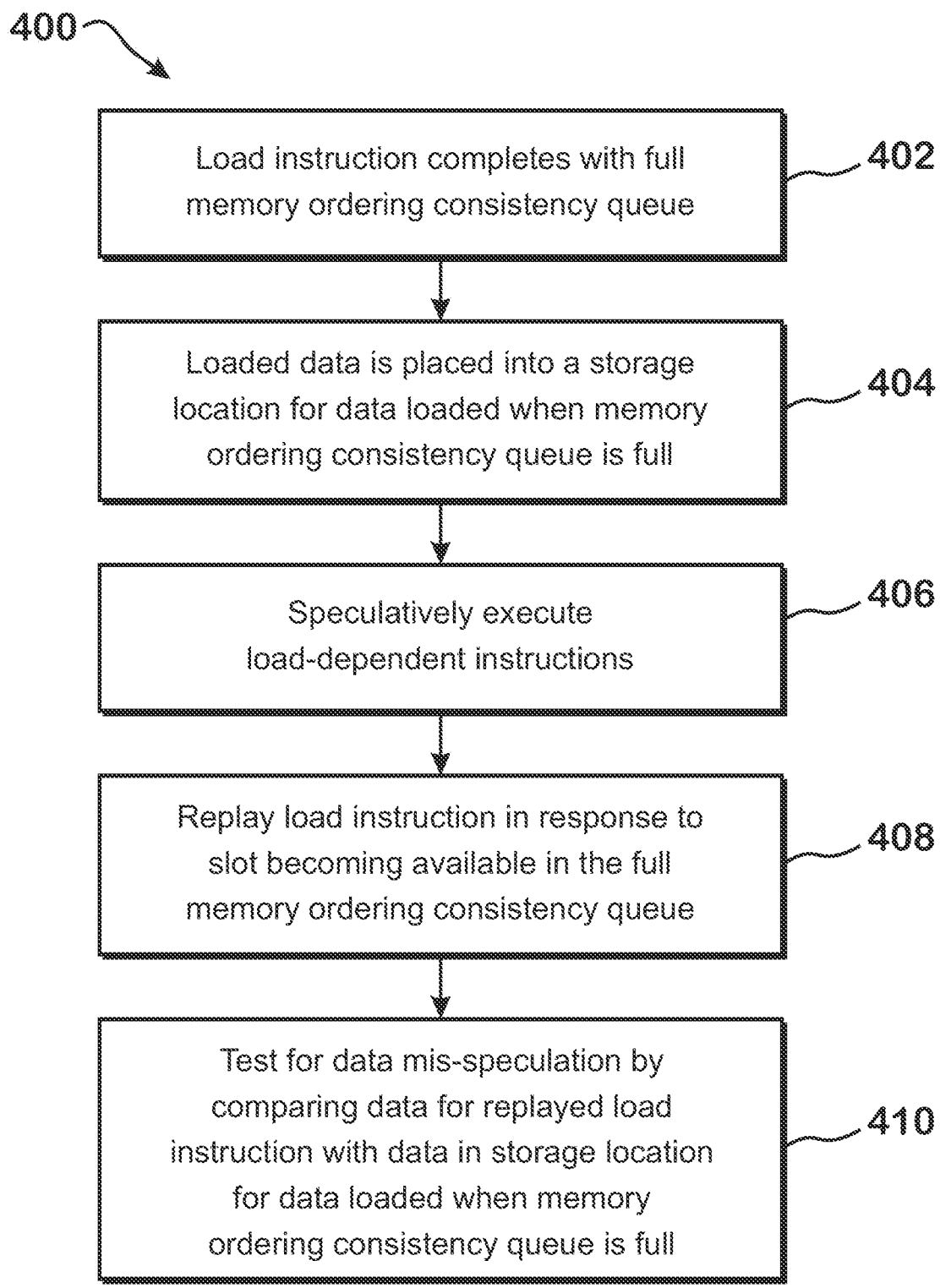
FIG. 4 is a flow diagram of a method for speculatively executing instructions dependent on a load instruction where a memory ordering consistency queue is full, according to an example.

FIG. 4 is a flow diagram of a method 400 for speculatively executing instructions dependent on a load instruction where a memory ordering consistency queue is full, according to an example. Although described with respect to the system of FIGS. 1-3B, those of skill in the art will understand that any system configured to perform the steps of the method 400 in any technically feasible order falls within the scope of the present disclosure.

The method 400 begins at step 402, where a load instruction completes and a memory ordering consistency queue 232 that the load instruction is eligible to be placed in is full. A load instruction is complete when data requested by the load instruction has been returned to the load/store unit 214. The load instruction, which is already in the load queue 224, remains there. At step 404, the load/store unit 214 places the loaded data into a storage location for data that is loaded when a memory ordering consistency queue 232 is full. As described elsewhere herein, in one example, that storage location is the register file 218 and in another example, that storage location is a temporary load data storage memory 320.

At step 406, the instruction pipeline 200 speculatively executes load-dependent instructions that are dependent on the load instruction discussed with respect to step 402. Load-dependent instructions are instructions that consume the value loaded by the load instruction as an operand, or are instructions that are dependent on other load-dependent instructions. These instructions are executed speculatively because it is not certain that the values they consume are correct, since the load instructions may be determined to have violated a memory ordering rule.

At step 408, in response to a slot becoming available in the full memory ordering consistency queue 232, the load/store unit 214 replays the load instruction to fetch the data again. At step 410, the load/store unit 214 tests for a data mis-speculation for the speculatively executed load-dependent instructions by comparing data loaded by the replayed load instruction with the data for the originally executed load instruction stored in the storage location for data loaded when the memory ordering consistency queue 232 was full. The test includes comparing the value for replayed load with the value in the storage location. If the values are not the same, then a mis-speculation occurs and the load instruction and load-dependent instructions are flushed and the load instruction is replayed. If the values are the same, no mis-speculation has occurred.

If no data mis-speculation has occurred, then the load/store unit 214 moves the load instruction to the memory ordering consistency queue 232 that was full and is now available. While in this memory ordering consistency queue 232, the load/store unit 214 monitors the load instruction for violations of the memory ordering rules associated with that queue 232. Several example techniques for testing for such violations are described herein. The load instruction leaves the queue if no violation occurs while load instruction is in the queue 232 and if it becomes certain that no violation can occur (e.g., the load instruction becomes the oldest load instruction in the queue 232 or there are no more store instructions that are older than the load instruction and that have not yet had their physical address determined). If the load instruction is no longer in any memory ordering consistency queue 232, then the load instruction becomes ready to retire.

The term "instruction" as used herein may refer to either architectural instructions or micro-operations generated by the decoder stage 208 or other stages of the instruction pipeline 200. As is generally known, the architectural instructions specified by an instruction set architecture are sometimes executed as multiple individual micro-operations by an instruction pipeline.

Where it is stated that data is fetched from a cache, it should be understood that the data may not exist in the cache upon request and that in response to such a request, the cache may request the data from higher levels in the hierarchy, which ultimately provide that data to the original cache.

It should be understood that many variations are possible based on the disclosure herein. Although features and elements are described above in particular combinations, each feature or element may be used alone without the other features and elements or in various combinations with or without other features and elements.

Various elements described herein are implemented as circuitry that performs the functionality described herein, as software executing on a processor, or as a combination thereof. In FIG. 1, the processor 102 is a computer processor that performs the operations described herein. The input driver 112, output driver 114, input devices 108, and output devices 110 are software executing on one or more processors, hardware, or a combination thereof. The various elements of the instruction pipeline 200 are hardware circuits.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for speculatively executing load-dependent instructions, comprising:
   detecting that a memory ordering consistency queue is full for a completed load instruction;
   storing data loaded by the completed load instruction into a storage location for storing data when the memory ordering consistency queue is full;
   speculatively executing instructions that are dependent on the completed load instruction;
   in response to a slot becoming available in the memory ordering consistency queue, replaying the completed load instruction as a replayed load instruction; and
   in response to receiving loaded data for the replayed load instruction, testing for a data mis-speculation by comparing the loaded data for the replayed load instruction with the data loaded by the completed load instruction that is stored in the storage location.

2. The method of claim 1, further comprising:
   in response to determining that the loaded data for the replayed load instruction is the same as the data loaded by the completed load instruction, determining that no violation has occurred for the memory ordering rules.

3. The method of claim 2, further comprising:
   removing the load instruction from a load queue;
   storing the load instruction in the memory ordering consistency queue; and
   testing for violation of the memory ordering consistency rules for the load instruction in the memory ordering consistency queue.

4. The method of claim 1, further comprising
   in response to determining that the loaded data for the replayed load instruction is not the same as the data loaded by the completed load instruction, determining that a violation has occurred for the memory ordering consistency semantic.

5. The method of claim 4, further comprising:
in response to the violation occurring, flushing and replaying the loading instruction.

6. The method of claim 1, wherein instructions that are dependent on the completed load instruction comprise instructions that consume the data loaded by the completed load instruction.

7. The method of claim 1, wherein the memory ordering rule comprises a load-to-load ordering rule.

8. The method of claim 1, wherein the memory ordering rule comprises a store-to-load ordering rule.

9. The method of claim 1, wherein:
the storage location comprises one of a register in a register file, the register being a destination register of the completed load instruction, and a memory dedicated to store loaded data for testing for violations of memory ordering consistency semantics for load-dependent instructions.

10. A processor subsystem for speculatively executing load-dependent instructions, the processor subsystem comprising:
a memory ordering consistency queue; and
a load/store unit configured to:
detect that a memory ordering consistency queue is full for a completed load instruction;
store data loaded by the completed load instruction into a storage location for storing data on the condition that the memory ordering consistency queue is full;
permit instructions that are dependent on the completed load instruction to speculatively execute;
in response to a slot becoming available in the memory ordering consistency queue, replay the completed load instruction as a replayed load instruction; and
in response to receiving loaded data for the replayed load instruction, testing for a data mis-speculation by comparing the loaded data for the replayed load instruction with the data loaded by the completed load instruction that is stored in the storage location.

11. The processor subsystem of claim 10, wherein the load/store unit is further configured to:
in response to determining that the loaded data for the replayed load instruction is the same as the data loaded by the completed load instruction, determine that no violation has occurred for the memory ordering rules.

12. The processor subsystem of claim 11, wherein the load/store unit is further configured to:
remove the load instruction from a load queue;
store the load instruction in the memory ordering consistency queue; and
test for violation of the memory ordering consistency rules for the load instruction in the memory ordering consistency queue.

13. The processor subsystem of claim 10, wherein the load/store unit is further configured to:
in response to determining that the loaded data for the replayed load instruction is not the same as the data loaded by the completed load instruction, determine that a violation has occurred for the memory ordering consistency semantic.

14. The processor subsystem of claim 13, wherein the load/store unit is further configured to:
in response to the violation occurring, flush and replay the loading instruction.

15. The processor subsystem of claim 10, wherein instructions that are dependent on the completed load instruction comprise instructions that consume the data loaded by the completed load instruction.

16. The processor subsystem of claim 10, wherein the memory ordering rule comprises a load-to-load ordering rule.

17. The processor subsystem of claim 10, wherein the memory ordering rule comprises a store-to-load ordering rule.

18. The processor subsystem of claim 10, wherein:
the storage location comprises one of a register in a register file, the register being a destination register of the completed load instruction, and a memory dedicated to store loaded data for testing for violations of memory ordering consistency semantics for load-dependent instructions.

19. A processor for speculatively executing load-dependent instructions, the processor comprising:
a memory ordering consistency queue;
a load/store unit configured to:
detect that a memory ordering consistency queue is full for a completed load instruction;
store data loaded by the completed load instruction into a storage location for storing data when the memory ordering consistency queue is full;
permit instructions that are dependent on the completed load instruction to speculatively execute;
in response to a slot becoming available in the memory ordering consistency queue, replay the completed load instruction as a replayed load instruction; and
in response to receiving loaded data for the replayed load instruction, testing for a data mis-speculation by comparing the loaded data for the replayed load instruction with the data loaded by the completed load instruction that is stored in the storage location; and
one or more functional units configured to speculatively execute the instructions that are dependent on the completed load instruction.

20. The processor of claim 19, wherein the memory ordering rule comprises one of a load-to-load ordering rule and a store-to-load ordering rule.

* * * * *